(12) United States Patent
Reller et al.

(10) Patent No.: US 6,201,370 B1
(45) Date of Patent: Mar. 13, 2001

(54) PORTABLE POWER SUPPLY

(76) Inventors: Troy M. Reller, 18272 Coneflower La., Eden Prairie, MN (US) 55346; John S. Whiting, 5230 Yorktown La., Plymouth, MN (US) 55442

( * ) Notice: Subject to any disclaimer, the term of this patent is extended or adjusted under 35 U.S.C. 154(b) by 0 days.

(21) Appl. No.: 09/411,779

(22) Filed: Oct. 1, 1999

(51) Int. Cl.⁷ .................................................. H01M 10/46
(52) U.S. Cl. ............................................................. 320/107
(58) Field of Search .................................... 320/103, 104, 320/105, 132, 107, 112, 113

(56) References Cited

U.S. PATENT DOCUMENTS

| | | |
|---|---|---|
| 4,791,347 | 12/1988 | Britton . |
| 4,857,820 | 8/1989 | Tompkins et al. . |
| 5,637,978 | 6/1997 | Kellett et al. . |

*Primary Examiner*—Edward H. Tso
(74) *Attorney, Agent, or Firm*—Merchant & Gould P.C.

(57) ABSTRACT

A portable power source having a battery that is electrically connected to a power circuit that is configured to generate a higher output voltage than the voltage generated by the internal battery. The power circuit is electrically connected to a connection device that distributes the higher output voltage to an external battery source. The power source also includes a case that includes an integral handle for carrying the power source. The handle is formed into the case that includes an internal compartment that is covered by a movable door formed into the case. The door is movable between open and closed positions and arranged and configured to open a switch when the door is in the closed position and close the switch when the door is in the open position. The switch controlled by the movable door controls the application of power to all components comprising the power circuit.

6 Claims, 6 Drawing Sheets

PORTABLE POWER SUPPLY

FIELD OF THE INVENTION

The present invention generally relates to power sources, and in particular, to portable power supplies for use in providing portable power.

BACKGROUND

Often times, motor vehicle batteries become discharged, typically by leaving lights or other accessories on after the vehicle is turned off, by cold weather, or simply by wear as the battery ages. When a motor vehicle battery become discharged, it either has to be recharged prior to starting, or it has to be "jump-started." Battery chargers and jumper cables are readily available on the market. These methods usually involve opening the hood of the vehicle to connect the battery charger or the jumper cables to the motor vehicle's battery. These methods also require some knowledge of the polarity of the battery and the device connected to it in order to avoid dangerous accidents, such as the battery exploding. These methods may also require the person to exit the vehicle and expose themselves to environmental elements, such as rain, snow, extreme heat, or extreme cold while charging the vehicle's battery. In addition jump-starting requires the assistance of another vehicle, and a battery charger requires an external power source.

Improvements in devices for recharging a motor vehicle battery are desirable.

SUMMARY OF THE DISCLOSURE

In one aspect of the present invention, one example embodiment involves a power source. The power source includes a battery having an input voltage electrically connected to a circuit for generating a modified output voltage and a connection device.

One preferred embodiment of the present invention includes a display illustrating a state of charge of an internal battery, displaying the state of charge during charging, and displaying the state of charge during recharging.

Another preferred embodiment of the present invention includes a case having a door, movable between an open and a closed position. The door arranged and configured to open a switch of the circuit.

Another preferred embodiment of the present invention wherein the input voltage is 12 volts and the output voltage is 15 volts.

The above summary of principles of the disclosure is not intended to describe each illustrated embodiment or every implementation of the present disclosure. The figures and the detailed description that follow more particularly exemplify certain preferred embodiments utilizing the principles disclosed herein.

BRIEF DESCRIPTION OF THE DRAWINGS

Principles of the invention may be more completely understood in consideration of the detailed description of various embodiments of the invention that follows in connection with the accompanying drawings in which.

Figure 1:
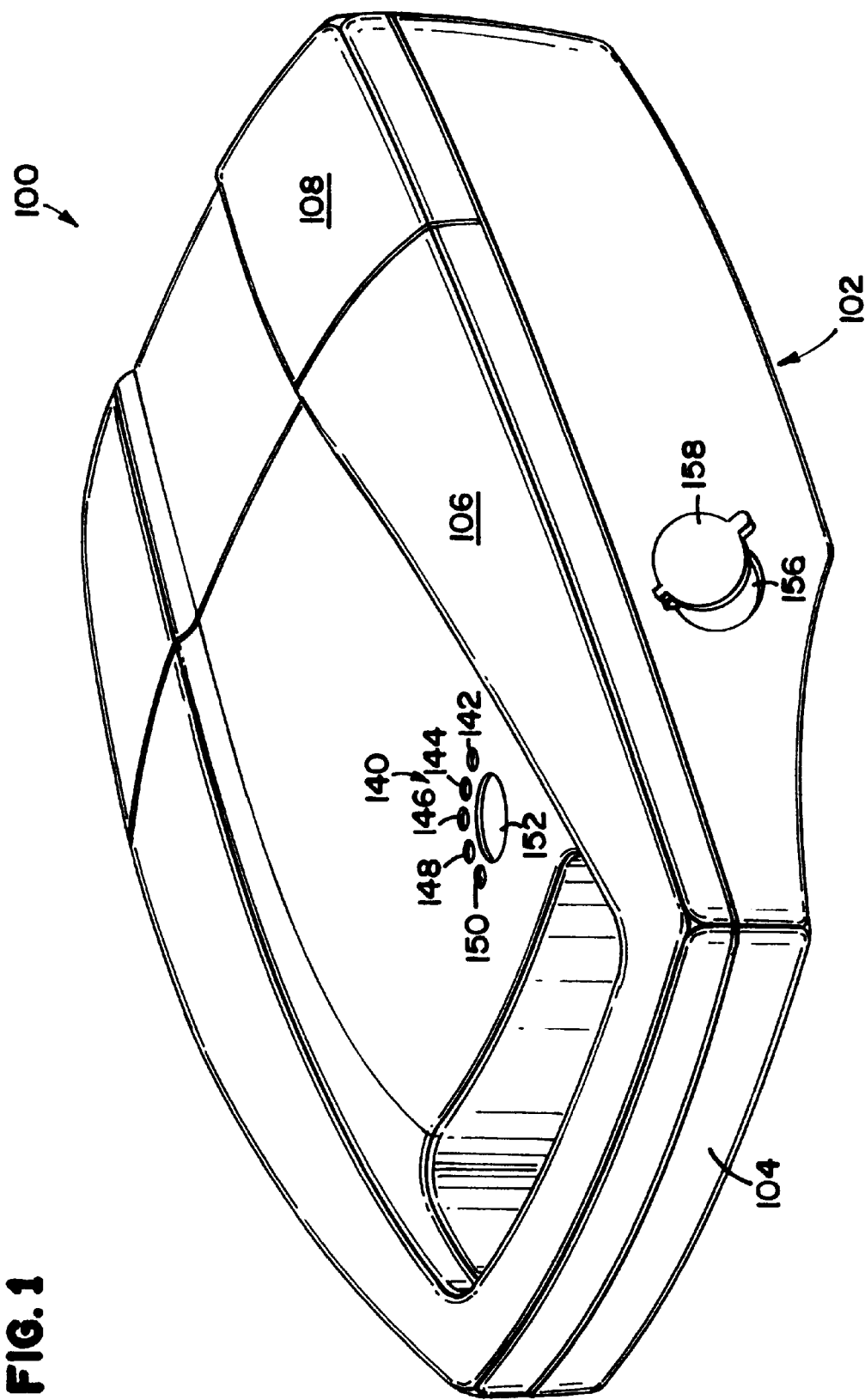
FIG. 1 is a perspective view of a portable power source, according to an example embodiment of the present invention.

While principles of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

The principles described herein are believed to be applicable to a variety of applications. The principles of the disclosure have been found to be particularly advantageous for portable power sources. An appreciation of various aspects is best gained through a discussion of an application example for such a power source.

A portable power source has a power supply, a case, a display, and a connection device. The portable power source may also have an auxiliary power outlet, a power supply for recharging the power supply, and a storage compartment for the connection device and the power supply.

Attention is directed to FIG. 1, illustrating a perspective view of an embodiment of a portable power source 100. The power source 100 includes a case 102. Preferably, the case 102 is designed to be easily transported and stored, for example, under a motor vehicle seat or in the trunk of a motor vehicle. The case has a shell 104, a cover 106, and a door 108. The shell 104 provides a containment section for containing the internal components of the power source 100. The cover 106 encloses the case 102, and protects the internal components of the power source 100. Preferably, the cover 106 is semi-permanently attached to the shell 104. By the term "semi-permanently," it is meant that the cover 106 is attached to the shell 104 by attachment devices, such as screws, that require a special wrench to unscrew, thereby prohibiting the typical user from gaining access to the internal components of the power source 100. The semi-permanent attachment of the cover 106 protects the user from injury and the internal components from damage.

Figure 2:
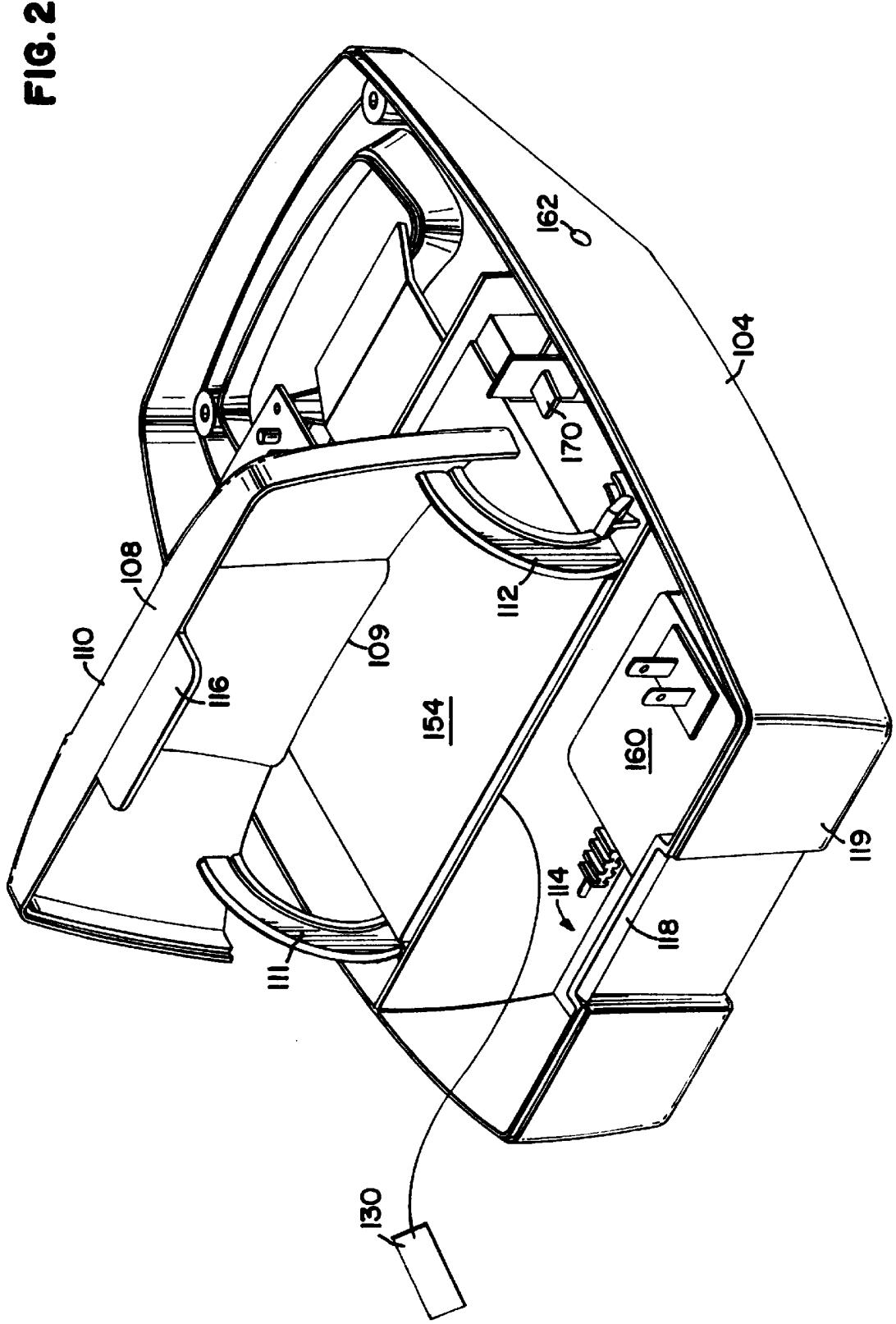
FIG. 2 is perspective view of the portable power source of FIG. 1 with the cover partially removed and the door open, according to an example embodiment of the present invention.

The door 108 is movable between a closed position as illustrated in FIG. 1 and an open position as illustrated in FIG. 2. As shown in FIG. 2, the door 108 has a first end 109 and an opposite second end 110. The first end 109 is attached to the shell 104 by first and second hinge devices 111, 112. Preferably, the first and second hinge devices 111, 112 are banana-type hinges having a rounded concave shape. The banana-type hinges allow the door 108 to swing up and away from the shell 104 providing complete access to a storage compartment 114 within the shell 104. Alternatively, the door 108 may be attached by other means. The storage compartment 114 provides a containment section for storing the connection devices that will be described in more detail later. The door 108 provides access to the storage compartment 114 by moving to the open position and encloses the storage compartment 114 by moving to the closed position. The door 108 has a latch device 116 at the second end 110 for securing the second end 110 to the shell 104. The shell 104 has a ledge or ridge 118 that is adapted to receive the latch device 116. In the closed position, the latch device 116 snaps over the ledge 118, securing the first end 110 of the door 108 to the shell 104. By the term "snaps over," it is meant that the latch device 116 is designed to flex, allowing it to move outward and over the ledge 118, yet the latch device 116 is sufficiently rigid to return to its natural position, parallel to a bottom 119 of the shell 104, after moving past the ledge 118.

Figure 3:
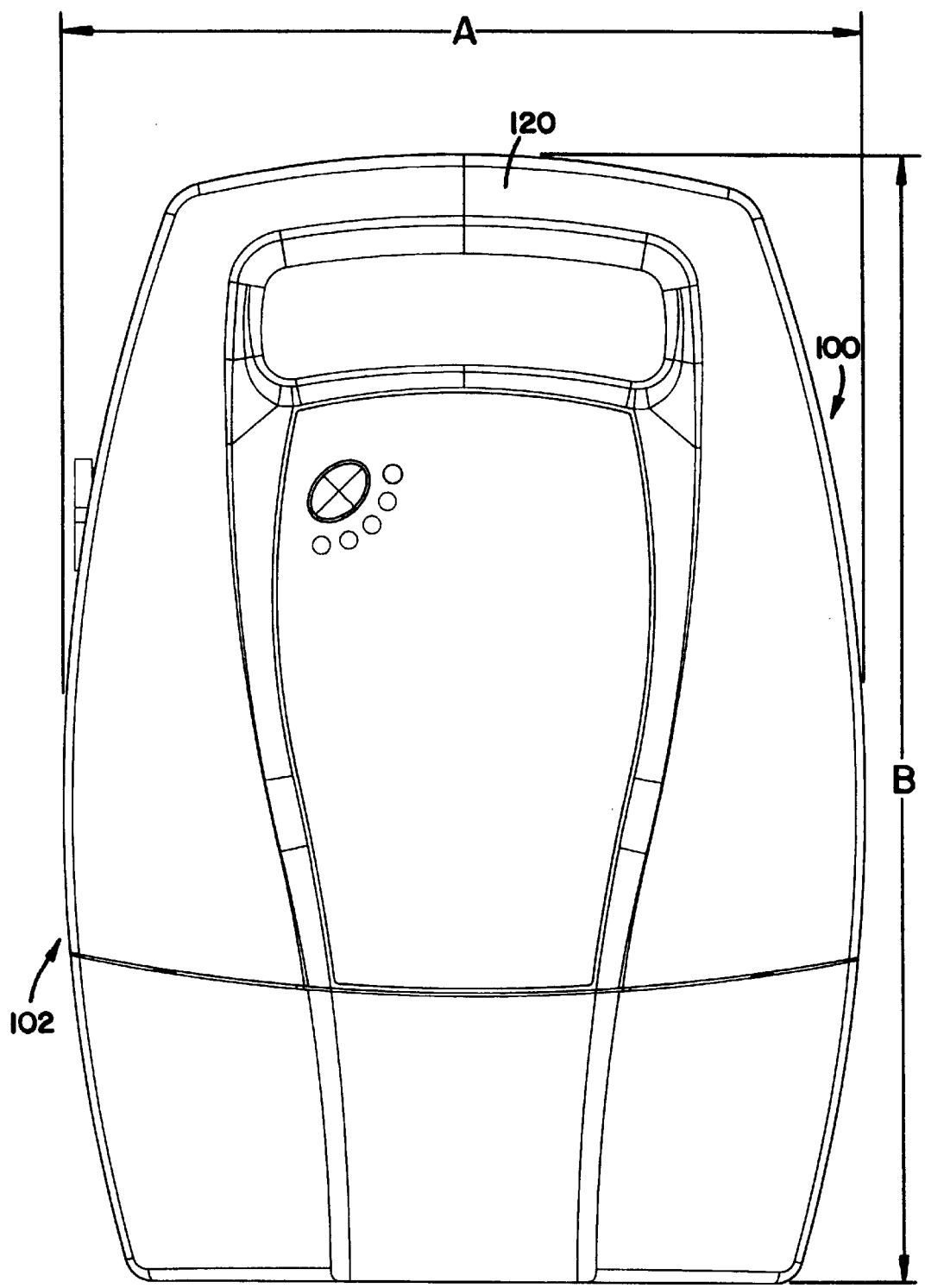
FIG. 3 is a top view of the portable power source of FIG. 1, according to an example embodiment of the present invention.
Figure 4:
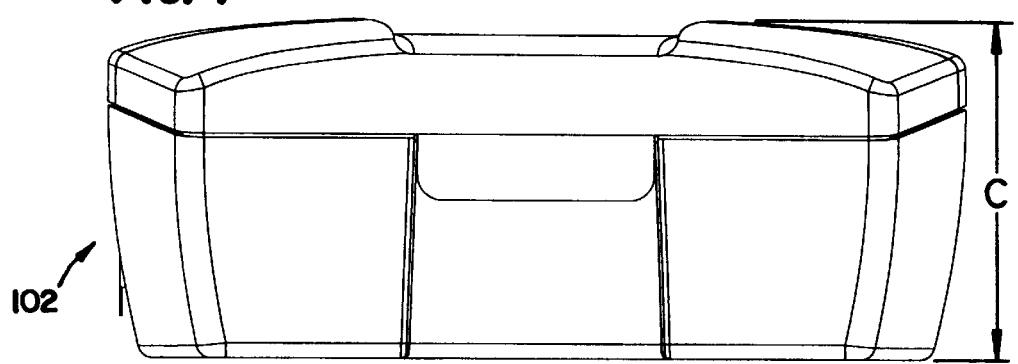
FIG. 4 is a back view of the portable power source of FIG. 1, according to an example embodiment of the present invention.

Attention is directed to FIGS. 3 and 4. The case 102 has a width A, a length B, and a height C at the highest point of the case 102. Preferably, the width A is between 6 inches (152.4 mm) and 10 inches (254 mm), and typically is 8.44 inches (214.4 mm). Preferably, the length B is between 9 inches (228.6 mm) and 14 inches (355.6 mm), and typically is 11.74 inches (298.2 mm). Preferably, the height C is between 1.5 inches (38.1 mm) and 4 inches (101.6 mm), and typically is 2.49 inches (63.2 mm). Alternatively, any size or shape desired could be used.

Figure 5:
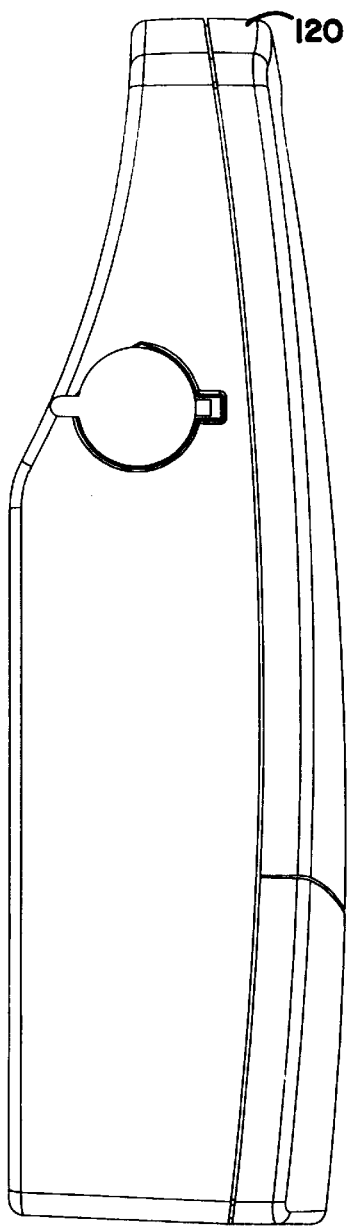
FIG. 5 is a side view of the portable power source of FIG. 1, according to an example embodiment of the present invention.

Preferably, the case 102 includes an integral handle 120 for carrying the power source 100. The handle 120 is formed into both the shell 104 and the cover 106 as shown in FIG. 1. Attention is directed to FIG. 5. Preferably, the handle 120 is typically thinner than the rest of the case 102 as illustrated and is designed to ergonomically fit a human hand. To carry the power source 100, the user grasps the handle 120 and lifts the power source 100.

Referring back to FIG. 1, the power source 100 includes a display 140. The display 140 can provide a vast array of information regarding the power source 100. The information the display can provide includes, displaying the state of charge of an internal battery, displaying the state of charge during charging, and displaying the state of charge during recharging. In the embodiment shown in FIG. 1, the display 140 consists of first, second, third, fourth, and fifth illuminating devices, preferably LEDs 142, 144, 146, 148, 150. The first, second, and third LEDs lights 142, 144, 146 are red; the fourth LED 148 is yellow, and the fifth LED 150 is green. In alternative embodiments, any number of lights or any color could be used. In other alternative embodiments, different types of display could be used, for example, a graph.

Preferably, the power source 100 has a test button 152. The test button 152 is used to activate the display 140 for displaying the state of charge in the internal battery in its static state. By the term "static state," it is meant the state of charge in the internal battery when it is neither being charged or charging. By pressing the test button 152, the display 140 will illuminate the first light 142, the first and second light 142, 144, the first, second, and third lights 142, 144, 146, or none of the lights. If the display 140 does not illuminate when the test button 152 is pressed, the state of the battery charge is below a minimal level. If the display illuminates the first light 142, it is an indication that the battery has a minimal charge. If the display illuminates the first and second lights 142, 144, it is an indication that the battery has an acceptable charge. If the display illuminates all three lights 142, 144, 146, it is an indication that the battery has an optimal charge. Alternatively, the test button 152 could activate any type of display capable of indicating battery charge. The alternate display could comprise any number of lights or any display configuration capable of communicating a battery charge level.

Figure 6A:
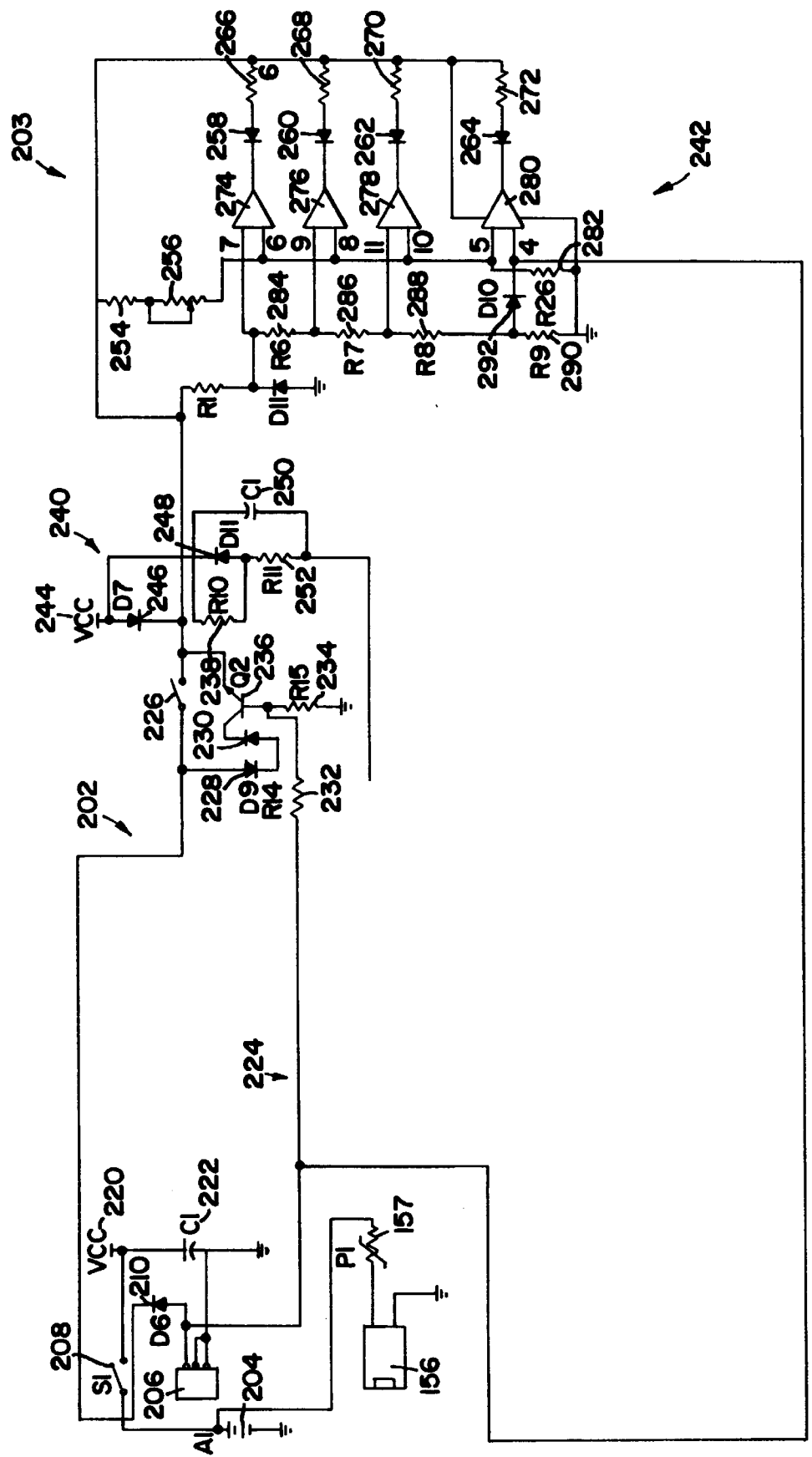
FIG. 6 is schematic of the circuitry of the portable power source of FIG. 1, according to an example embodiment of the present invention.
Figure 6B:
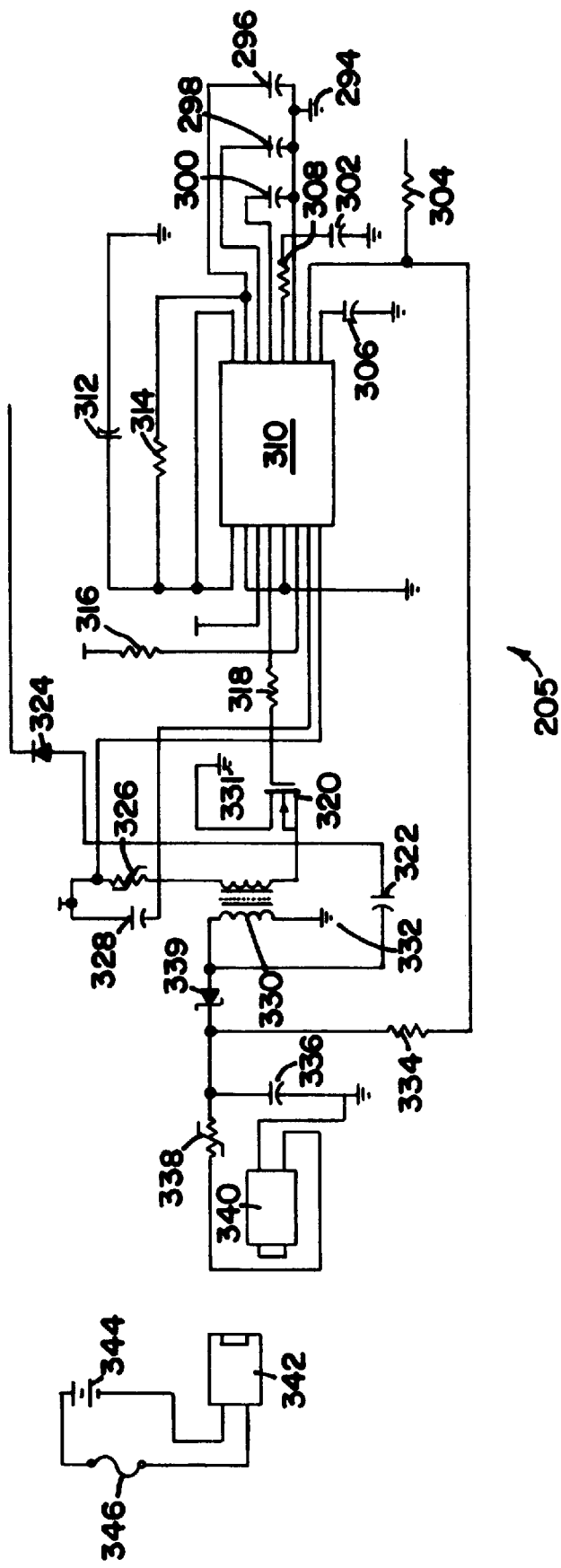

FIG. 6 illustrates an embodiment of the electrical circuitry 200 within the case 102 of the portable power source. The test button 152 (FIG. 1) and the LED display 140 (FIG. 1) are components of the portable power source circuitry 200. The portable power source circuitry 200 also includes a testing circuit 202 which includes a battery source 204 (analogous to the internal battery 154 of FIG. 2) and a test switch 226 (analogous to the test button 152 of FIG. 1). The battery source 204 provides energy to all internal components comprising the portable power source circuitry 200. The battery source 204 is connected to the external power outlet 156 socket through a positive temperature coefficient resistor 157. The external power outlet 156 socket is energized by two pins, a first pin being connected to ground and a second pin connected to the internal battery source 204 through the positive temperature coefficient resistor 157. The battery source 204 is also connected to one side of a single pole switch 208 that is normally closed. The other side of the single pole switch is connected to a reference voltage 220, that is used as the common connection point for the internal battery source 204 voltage. The single pole switch 208 functions to disconnect power from all internal components except the external power outlet when the storage compartment door on the embodiment disclosed herein is closed. The battery source 204 is also connected to the cathode of a diode D6 210 that is used to block current from flowing from the battery to the charging jack 206. This is done so that a user can sense when the charging jack 206 has been plugged in. The anode of diode D6 210 is connected to the third pin on the charging jack 206. The first pin on the charging jack 206 is connected to ground. A second pin on the charging jack 206, which is not used, is also connected to ground. The charging jack 206 is used as a connection point whereat an external power source can be connected and internal charging battery 204 can be recharged.

When the test switch 226 is closed, the voltage from the battery source 204 is applied directly to a display circuit 203. In the preferred embodiment, the display circuit 203 is a comparitor circuit. Preferably, the comparitor circuit 242 includes first, second, third, and fourth LEDs 258, 260, 262, 264. Preferably, the first, second, and third LEDs 258, 260, 262 are red and the fourth LED is a green 264. The first, second, third, and fourth LEDs 258, 260, 262, 264 are analogous to the first, second, third, and fifth illuminating devices 142, 144, 146, 150, respectively, of FIG. 1. It is to be understood that the first, second, third, and fourth LEDs 258, 260, 262, 264 could be any color.

The comparitor circuit 242 compares the voltage from the internal battery 204 to a preset voltage level. In the preferred embodiment, the preset voltage level is between 12 volts and 12.8 volts. If the internal battery 204 is delivering greater than 12.8 volts to the comparitor circuit 242, the comparitor circuit 242 illuminates the first, second, and third LEDs 258, 260, 262. Correspondingly, the user sees three illuminated LEDs 142, 144, 146 (FIG. 1) indicating to the user that the internal battery 204 is at full or one hundred percent strength. As the internal battery 204 discharges, the voltage output therefrom decreases. When the internal battery 204 voltage drops below 12.8 volts, there is no longer enough power to illuminate the third LED 262, and the user sees that only the first and second LEDs 258 and 260 are illuminated. Illumination of only the first and second LEDs 258 and 260 indicates that the internal battery 204 is between seventy five percent and one hundred percent full strength. As the internal battery 204 continues to discharge and the voltage output therefrom drops below 12.4 volts, there is no longer enough power to illuminate the second and third LEDs 260, 262 and the user sees that only the first LED 258 is illuminated. Illumination of only the first LED 258, indicates that the internal battery 204 is between fifty percent and seventy five percent full strength. When the voltage drops below 12 volts, there is no longer enough power to illuminate the first, second and third LEDs 258, 260, 262. Accordingly, none of the LEDs are illuminated, indicating that the internal battery 204 is at less than fifty percent full strength. A diode D7 246 prevents power from passing to the converter chip 310 when the test button 152 is pressed.

Referring back to FIG. 6, the power source 100 also has an external, auxiliary power outlet 156. The external power outlet 156 provides power to any 12 volt device, such as a cellular phone. In the present embodiment, the external power outlet 156 is a female cigarette lighter-type socket, allowing male cigarette lighter adapter plugs to be inserted therein. In the present embodiment, the external power outlet 156 has a cap 156 to cover the outlet socket opening 156. The external power outlet 156 socket is energized by two pins, a first being connected to ground and a second pin connected to the internal battery source 204 through a positive temperature coefficient resistor 157. Resistor 157 functions to limit the current between the external power outlet 156 and the internal battery 204, thereby protecting the internal components of the power source 100 from damage.

Referring back to FIG. 1, preferably, the internal battery 154 of the power source 100 is rechargeable. Referring to FIG. 2, the power source 100 includes a standard 15 volt wall transformer 160, for example model #MKD-48122602 by ITE, designed to plug into a standard 120 volt wall outlet. The transformer 160 has a first end having a standard two pronged wall plug that plugs into a standard wall outlet. Transformer 160 has a second end comprised of a male plug that plugs into a female receiving jack 162 positioned on the side of the power source 100. The transformer 160 delivers approximately between 14 volts and 15 volts, and typically 14.5 volts, at 0.5 amperes to the internal battery 154 of the power source 100 when electrically connected to a standard 120 volt wall outlet and the female receiving jack 162.

Referring back to FIG. 6, the portable power source circuitry 200 within the case shown in FIG. 1, includes a recharging circuit 201, a testing circuit 202, a display circuit 203, and a converter circuit 205. The recharging circuit 201 includes an internal battery 204, a charging jack 206 (analogous to the female receiving jack 162 of FIG. 2), a first and second resistors R14 232, R15 234, a first transistor 226 and first and second diodes D9 228, D8 230. The charging jack 206 receives power from an external power supply (analogous to the wall transformer 160 of FIG. 2). The first and second resistors R14 232, R15 234 have power applied thereto from the charging jack 206 upon receiving the external power source. The first and second diodes D9 228, D8 230 apply power to the first transistor 236 by way of dividing and stepping down the voltage and thereby causing the first transistor 236 to turn on. Turning on the first transistor 236 applies power to the comparitor circuit 242. As a result of the series connection with the first transistor 236, the first and second diodes 228, 230 provide the voltage drop along with the transistor 236 to change the scale of the voltage that's supplied to the comparitor circuit 242.

Referring back to FIG. 1, in the illustrated embodiment, the display 140 provides a visual queue to the user of the status of recharging the internal battery 154. Referring back to FIG. 6, because the external recharging power source 160 delivers a voltage greater than the voltage range of 12 to 12.8 volts that the comparitor circuit 242 recognizes, the first and second diodes 228, 230 are used to reduce the external power source 160 voltage before it reaches the comparitor circuit 242. The reduction of the external power source 160 voltage is done to set the calibration point for the state of the recharge circuit 224. The first diode 228 causes a voltage drop of approximately 0.7 volts and the second diode 230 causes a voltage drop of approximately 0.7 volts. There is also a 0.3 voltage drop across the transistor 236, resulting in a total of approximately 1.7 volts dropped in the external power source 160 voltage before it reaches the comparitor circuit 242. At full charging, the external power source 160 delivers approximately 14.5 volts to the internal battery 204. Because of the voltage drop of approximately 1.7 volts, only 12.8 volts, approximately, is transferred across the comparitor circuit 242. 12.8 volts is the upper limit that the comparitor circuit 242 recognizes for illuminating the first three LEDs 258, 260, 262. The voltage drop of 1.7 volts allows the comparitor circuit 242 to operate in accordance with its desired function of indicating charge level upon pressing test button 152. Thus, the display 140 is able to provide an accurate visual queue to the user of the state of charge on the internal battery 204.

A primary function of the power source 100 is the recharging of a motor vehicle battery. The power source 100 includes a connection device 130 for connecting to the motor vehicle and for delivering an electric current to the motor vehicle's battery. In the present embodiment, the connection device 130 is the male portion of a cigarette lighter adapter, readily available on the market. The connection device 130 conveniently plugs into the female receiver portion of the motor vehicle cigarette lighter. Upon insertion of the connection device 130 into the female receiver portion of the cigarette lighter of a motor vehicle, and an electrical connection is established, the display indicates to the user that the motor vehicle battery is charging. In the present embodiment, the fourth light 148 illuminates when an electrical connection is established. In some motor vehicles, the ignition key must be turned to "accessory" in order to complete the electrical connection between the connection device 130 and the motor vehicle battery. The fourth light 148 will not illuminate until the circuit is complete.

The user allows the power source 100 to charge the motor vehicle battery until the motor vehicle battery is charged enough to start the motor vehicle. Use of the present embodiment allows the user to electrically connect the power source 100 to the motor vehicle's battery for approximately between 5 and 40 minutes. Typically, charging a motor vehicle batter with the present embodiment takes 15 minutes, although charging time varies depending on a number of conditions, such as the state of charge of the motor vehicle's battery and the temperature of the battery. During charging, the power source 100 delivers a voltage to the motor vehicle's battery that is greater than 12 volts. In the preferred embodiment, the voltage delivered to the motor vehicle battery is 15 volts and the current is 5 amps. When the power source 100 has charged the motor vehicle battery to the extent possible, the display indicates that optimal charge has been obtained. Optimal charge is indicated by the illumination of the fifth light 150.

Referring back to FIG. 2, a switch 170 is used to energize the internal components. In the illustrated embodiment, the door 108 activates the switch 170 when the door 108 is in the open position. When the door 108 is in the closed position, the second hinge device 112 pushes the switch 170 open. As the door 108 opens, the hinge device 112 releases the switch 170, closing the switch 170. Referring back to FIG. 6, the portable power source circuitry includes a charging circuit 240 that has a switch 208 that is analogous to the switch 170 of FIG. 2. As the door 108 (FIG. 2) opens, the hinge device 112 (FIG. 2) releases the switch 170, closing the switch 208 and completing the circuit. When the switch 208 is open, all internal components within the circuit shown in FIG. 6 are disconnected from internal battery 204 except the external auxiliary power outlet 156. When the switch 208 is closed, the internal battery source 204 is applied to a VCC node 220 that is connected to a third diode 546. The power is then applied to the comparitor circuit 242. The power is also applied to a DC to DC converter chip 310. The converter chip 310 can be any DC to DC converter chip, for example Linear Technology's LD 1680 converter chip.

The converter chip 310 applies the power to a supply resistor R16 318 and a supply transistor 320. Power flows through a transformer 330, a supply diode D1 339, a current limiting device 338, and to an output plug 340. The converter chip 310 monitors the output voltage coming through the supply diode D1 336. First and second feedback resistors R16 318, R12 334 feed a voltage back to the converter chip 310 that is proportional to the output voltage, typically 15 volts. If this feedback voltage is too low, the converter chip 310 increases the duty cycle of the supply transistor 320. Increasing the duty cycle of the supply transistor 320 transfers more energy through the transformer 330 resulting in higher transformer output voltage. As the energy that is transferred through the transformer 330 is increased, the output voltage from the transformer 330 increases. If the feedback voltage is too low, the converter chip 310 decreases the duty cycle of the supply transistor 320. Decreasing the duty cycle of the supply transistor 320 transfers less energy through the transformer 330 resulting in a lower transformer output voltage. As the energy that is transferred through the transformer 330 is decreased, the output voltage from the transformer 330 decreases. In this manner, controlling the duty cycle of the supply transformer, the converter chip 310 can maintain a stable output voltage of approximately 15 volts.

The current limiting device 338, which serves as a safety device during charging, protecting the transformer 330, is a positive coefficient resistor. If something malfunctions during charging, such as the battery is connected backwards in the motor vehicle, the impedance in the current limiting device 338 increases, limiting the current applied to the motor vehicle.

Between the supply transistor 320 and the transformer 330, the voltage fluctuates according to the duty cycle of the transistor 320. When the transistor 320 turns on, the voltage across the transformer goes to zero because the power is sent to first and second grounds 331, 332. When the transistor 320 turns off, the voltage rises to 12 volts. The turning on and off of the transistor 320, creates a voltage wave from 0 to 12 volts. The converter chip 310 controls the duty cycle of the transistor 320. The duty cycle is a ratio of the time the transistor 320 is on versus the time the transistor 320 is off. The converter chip 310 controls the output voltage across the transformer 330 by changing the duty cycle of the transistor 320.

A supply capacitor C3 336 is used to stabilize the output voltage across the output plug 340. During the high end of the voltage pulse, resulting from transistor 320 being on, the capacitor C3 336 is being charged up. After the voltage pulse goes to zero because the transistor is on, the capacitor C3 336 keeps the voltage across the output plug 340 constant by discharging. The supply diode D1 339 also keeps the voltage constant across the output plug 340. When the transformer 330 is charged and the voltage is high, current will charge the capacitor C3 336. When the transistor 320 is off the diode D1 339 prevents the current from flowing backwards and discharging the capacitor C3 336.

Preferably, the converter chip 310 is connected to a first stabilizing capacitor that is used for the converter chip's 310 internal reference of 1.25 volts. The converter chip 310 is also connected to a signal ground 294. This signal ground 294 grounds any interference that may be created by switching the supply transistor 320 on and off.

When the supply transistor 320 turns on, it discharges a capacitor 322 and energizes the transformer 330. When the transformer 330 turns off, energy is transferred across the transformer 330. Turning the transistor 320 on and off creates a voltage spike on the positive side of the capacitor 322. The voltage spike charges up the transformer 330 and dampens the spike, protecting the transformer 330. The voltage spike also contributes energy to the output voltage across output plug 340. The capacitor 322 reduces the amount of energy that the transformer 330 must dissipate by lowering the voltage across the transformer 330.

In the illustrated embodiment, the switch 208 keeps the battery 204 from discharging when not in use. If the circuit were complete without the switch 208, the converter chip 310 would be energized. Eventually, the converter chip 310 would completely discharge the internal battery 204. The switch 208 keeps the converter chip 310 from being energized except when the power source 100 (FIG. 1) is in use. In order for the user to use the power source 100, the user must open the door 108 (FIG. 2) and access the connector device 130 (FIG. 2). When the door 108 is opened, the converter chip 310 is energized and the power source 100 is ready to charge the motor vehicle's battery. Because the connector device 130 is connected to the circuit through the storage compartment 114 (FIG. 2), the door 108 cannot be closed while the power source 100 is in use, ensuring that the power source 100 is charging the motor vehicle's battery. Typically, after use, the user will place the connector device 130 back into the storage compartment 114 and close the door 108. Closing the door 108, breaks the circuit between the battery 204 and the converter chip 310.

In the preferred embodiment, while the power source 100 is charging the motor vehicle battery, the display 140 provides an indication to the user of the state of charge, depending on whether the first light 142, the first and second lights 142, 144, the first, second, and third lights 142, 144, 146 are illuminated, or none are illuminated. Still in reference to FIG. 6, when the door 108 is opened and the converter chip 310 is energized, the LEDs 258, 260, 262 illuminate depending on the state of charge in the battery 204. In the embodiment described, if greater than approximately 12.1 volts passes through the comparitor circuit 242, all three LEDs 258, 260, 262 illuminate. When the voltage is between approximately 11.7 volts and 12.1 volts, the third LED 262 is not illuminated and the first and second LEDs 258 and 260 are illuminated. When the voltage is between approximately 11.3 volts and 11.7 volts, only the first LED 258 is illuminated and the second and third LEDs 260 and 262 are not. When the voltage drops below 11.3 volts, none of the LEDs 258, 260, 262 are illuminated, indicating that the internal battery is below an acceptable charge level. Because the LEDs 258, 260, 262 of the comparitor circuit 242 are analogous to the first, second, and third lights 142, 144, 146 of the display 140, shown in FIG. 1, the user can visually see the relative strength of the internal battery during charge.

More specifically, FIG. 6 discloses the portable power source circuitry 200 which includes a recharging circuit 201, a testing circuit 202, a display circuit 203, and a converter circuit 205. The recharging circuit 201 includes an internal battery 204, a charging jack 206, first and second resistors 232, 234, a first transistor 226, and first and second diodes 228, 230. The internal battery 204 has a first end connected to ground and a second end connected to a positive temperature coefficient resistor 350. The positive temperature coefficient resistor 350 is positioned between the external auxiliary power outlet 156 and the internal battery 204. The positive temperature coefficient resistor 350 limits current to the external auxiliary power outlet 156, which in the embodiment illustrated is a female cigarette lighter socket. The external auxiliary power outlet 156 provides power to twelve volt accessories. External auxiliary power outlet 156 has a first pin 155 and a second pin 157 wherein the first pin 155 is connected to ground in the illustrated embodiment. In other embodiments, first pin 155 may be connected to the negative terminal of internal battery 204. The second pin is connected to the positive terminal of internal battery 204 through the positive temperature coefficient resistor 350. The positive terminal of internal battery 204 is also connected to one side of a single pole switch 208, which is normally closed. Single pole switch 208 (analogous to the switch 170 described above and illustrated in FIG. 2) disconnects power from all internal components except the external auxiliary power outlet 156 when engaged. The internal battery 204 is also connected to the cathode of a first diode 210. First diode 210 performs the function of blocking the flow of current from the battery to the charging jack 206. This is done to enable the user to sense when the charging jack 206 is plugged in. The charging jack 206 has three connection pins. The anode of first diode 210 is connected to the third pin of the charging jack 206. The first pin of the charging jack 206 is connected to ground. The second pin of the charging jack 206 is unused and also connected to ground. The charging jack 206 is the connection point for an external power source to recharge internal battery 204. The other side of single pole switch 208 is connected to a reference voltage source 220 which functions as a reference for the common connection point for the positive internal battery 204 voltage for the entire circuit. A first capacitor 222 is connected between the reference voltage source 220 and GND (GND is the common reference for the negative side of the battery). The first capacitor 222 is used for filtering the input to reduce any voltage spikes or transients that could effect the operation of the circuit.

Pin 3 of the charging jack 206 connects the recharging circuit 201 to a first resistor 232 within the testing circuit 202 portion of the portable power source circuitry 200. First resistor 232, and a second resistor 234 provide a voltage divider and limit the current supplied to a first transistor 236. When the external power source is connected to the charging jack 206, current flows through the first resistor 232, turning on first transistor 236. The collector of first transistor 236 is connected to internal battery 204 through second diode 228 and third diode 230. Second diode 228 and third diode 230 are used to provide a voltage drop to set the calibration point for the state of recharge circuit. The emitter of first transistor 236 provides current to third resistor 231. The third resistor 231 limits the current to a fourth diode 233 which functions as a voltage reference for the comparitors used to drive the state of recharge LED's 258, 260, 262. A resister divider network consisting of four resistors R6 284, R7 286, R8 288, R9 290 is used to divide the voltage reference provided by the fourth diode 233 to an appropriate level usable as an input to comparator (illustrated as 274, 276, 278, 280). The other input of the comparator 274, 276, 278, 280 is voltage received from the resistor divider network consisting of three resistor 254, 256, 282. Resistor divider network resistor 256 is used to compensate for variations in the input reference voltage developed across diode D11 248. Resistor R25 has variable resistance and is adjusted to precisely set the turn on point of each of the comparators 274, 276, 278, 280.

The values of these components were chosen so that as internal battery 204 recharges, the voltage at pin 10 of comparator 278, becomes greater than the voltage of pin 11. When this occurs, the output of comparator 278 (pin 13) is switched to ground. Pin 13 of comparator 278 is connected to the cathode of diode D4 262. The anode of diode D4 262 is connected to resistor R4 270. Resistor R4 270 limits the amount of current that will flow through diode D4 262 causing diode D4 262 to illuminate when pin 13 of comparator 278 is switched to GND. When pin 13 of comparator 278 is switched Vcc, diode D4 262 will not illuminate because of the voltage difference between the cathode and anode of diode D4 262. Comparators 274, 278 and the respective diodes D2 258, D3 260 and resistors R2 266, R3 268 function in a manner similar to that described above regarding comparator 278, diode D4 262 and resistor R4 270, only comparators 274, 278, diodes D2 258, D3 260 and resistors R2 266, R3 268 are set with a higher voltage limit. The higher voltage limit indicates that the internal battery 204 is more completely charged. Comparator 280, diode D5 264 and resistor R5 272 also function in a manner similar to the description above with respect to comparator 278, diode D4 262 and resistor R4 270, except the input to pin 4 of comparator 280 is supplied by pin 3 of the charging jack 206. When an external power supply is connected to charging jack 260, the voltage on pin 4 of comparator 280 becomes greater than the voltage on pin 5 of comparator 280 which causes the output (pin 2) of comparator 280 to switch to GND which causes diode D5 264 to illuminate, indicating that the external supply has been properly connected to charging jack 260 and internal battery 204 is being recharged. Diode D10 blocks current from flowing from pin 4 of comparator 280 to the resister divider network consisting of R6 284, R7 286, R8 288, R9 290. Diode D5 also indicates that all of the useful energy in internal battery 204 has been transferred to the external battery being charged 344. Diode D10 provides voltage to pin 4 of comparator 280 during the charge mode.

When the portable power source is not being recharged D2 258, D3 260, D4 262 serve as a percent of charge indicator. The percent of charge function is initiated by the user by pushing the test switch 226. The test switch is connected to the positive side of internal battery 204. The test switch 266 shorts out diodes D8 230 and D9 228, and transistor Q2 236 providing a different calibration point for the percentage of charge indicated by LED's D2 258, D3 260, D4 262. Diode D7 246 supplies current to percentage of charge circuitry when the single pole switch 208 is closed. Diode D7 246 also stops current from flowing to Vcc when the test switch is closed or transistor Q2 236 is on. This prevents the voltage converter from turning on when transistor Q2 236 is on or the test switch 226 is closed. This is done to prevent the converter from draining the internal battery 204 during the recharge or test mode.

The converter chip 310 is a commercially available controller for use in DC/DC converters. Capacitor C5 306 connects between pin 8 of converter chip 310 and ground. Capacitor C5 306 functions to stabilize an internal reference voltage in the converter chip 310. Pin 5 of converter chip 310 is connected to an RC network formed from resistor R19 308 and capacitor C7 302. This RC network is used to stabilize the feedback loop used in the DC/DC converter chip 310. Pin 4 of converter chip 310 is connected to capacitor C8 300. Capacitor C8 300 is used to set the soft start time of converter chip 310, thereby preventing high current spikes when the single pole switch 208 is closed. Pin 3 of converter chip 310 is connected to C9. C9 is used to set the sampling rate for the current limiting feature. This averages the current so you do not limit an every spike of current. Pin 2 of converter chip 310 is connected to capacitor C10 296 and resistor R17 314 in order to set the converter chip 310 switching frequency. Pin 16 of converter chip 310 is connected to capacitor C6 312. Capacitor C6 312 is used to stabilize an internal 5V reference in converter chip 310. Pin 11 of converter chip 310 is connected to resistor R18 316. Resistor R18 316 provides a current limited voltage which acts as an on instruction to converter chip 310, which is powered by its connection to Vcc and ground. Unused pin 15 of converter chip 310 is tied to ground. Resistor R16 318 is connected to pin 13 of converter chip 310. Pin 13 of converter chip 310 turns transistor Q1 320 on and off. Resistor R16 318 is used to limit the current to transistor Q1 320. The source of transistor Q1 320 is connected to ground The drain of transistor Q1 320 is connected to the primary side of the transformer 330.

When signaled by converter chip 310, transistor Q1 320 turns on shorting one side of the transformer 330 to ground and allowing current to flow through the transformer 330 primary coil. Transistor Q1 320 also discharges a capacitor C2 322 when it is on. The current flowing through the primary coil of transformer 330 creates a magnetic field in the transformer 330 core which stores the energy in the core. When transistor Q1 320 turns off as signaled by converter chip 310 the energy stored in the core of transformer 330 is transferred to the secondary winding of transformer 330. Capacitor C2 322, which was discharged by transistor Q1 320 is now recharged by the voltage which was induced across the secondary winding of transformer 330 which serves to limit the voltage spike. A positive temperature coefficient resistor 326 is connected between Vcc and the primary of transformer 330. Positive temperature coefficient resistor 326 is used to limit the amount of current that will flow through the primary winding of transformer 330 through transistor Q1 320 to ground. This is done to protect the transformer 330 and transistor Q1 320 from excessive current in the event that output plug 340 or external battery 346 is shorted or wired with the opposite polarity. Capacitor C6 328 is connected in parallel with the positive temperature coefficient resistor 326 and is used to filter noise out of the signals feed back to pins 9 & 10 of the converter chip 310.

If a voltage greater than an internal reference is sensed across positive temperature coefficient resistor 326 by pins 9 & 10 of converter chip 310, then converter chip 310 will decrease the duty cycle that it turns transistor Q1 320 on and off at. This will effectively lower the current through transistor Q1 320. This also protects transistor Q1 320 and transformer 330 from excessive current. Diode D1 339 is connect to the secondary windings of transformer 330. When transistor Q1 320 is off, diode D1 339 allows current to flow from the energy stored in the secondary windings of transformer 330 to charge capacitor C3 336 and to the output plug 340 through the positive temperature coefficient resistor 338. When transistor Q1 320 is on, diode D1 stops current from flowing from the battery being charged to the secondary windings of transformer 330.

Capacitor C3 336 is used as a current storage and voltage filtering device to supply a regulated DC voltage through to positive temperature coefficient resistor 338 which functions as an output current limiting device to the output plug 340. The voltage across capacitor C3 336 is kept at a constant level by the feedback to converter chip 310 through the voltage divider created by resistors R12 334 and R13 304. When the voltage across capacitor C3 336 falls below (150) the level set by resistors R12 334 and R13 304 and the converter chip 310 increases the duty cycle in which transistor Q1 320 is turned on and off, causing more energy to be transferred from the primary to the secondary of transformer 330. This causes the voltage across capacitor C3 336 to rise. However, it keeps the average voltage across capacitor C3 336 at 15 V, the set value. If the voltage across capacitor C3 336 goes to high, converter chip 310 decreases the duty cycle causing less energy to transfer and the voltage to fall back to 15V.

Output plug 340 is a male cigarette lighter plug. Pin 1 of output plug 340 is connected to positive temperature coefficient resistor 338 and Pin 2 is connected to ground. This allows the user to recharge the vehicle battery 344 through the vehicle cigarette lighter female receiving portion 342. The components for converter chip 310 were chosen and transformer 330 was designed so that a charging current of approximately 5 amps distributed through the output plug 340. As the vehicle battery 344 is being charged, internal battery 204 is being discharged. When the voltage on internal battery 204 falls below a set level, the voltage on pin 5 of comparator 280 becomes lower than the voltage on pin 4 of comparator 280 causing pin 2 of comparator 280 to be switched to ground. This causes diode D5 to illuminate, indicating that all of the energy available in internal battery 204 has been transferred to the vehicle battery 344.

Diode D11 248 indicates that the connection to the vehicle cigarette lighter female receiving portion 342 has been established and energy is being transferred to the vehicle battery 344. This is accomplished by using the fly back voltage created when transistor Q1 320 turns off. The voltage is generated by the primary windings of the transformer 330. The fly back voltage increases as the amount of current flowing in the primary windings of transformer 330 increases. Diode D12 allows this voltage to pass through, thereby supplying current to charge capacitor C4 250 and illuminate diode D11 248. Resistor R11 252 limits the current to diode D11 248. The current flowing through diode D12 324 must be large enough to make the voltage drop across resistor R10 238 high enough to enable diode D11 248. Resistors R11 252, R10 238, and capacitor C4 250 where chosen such the diode D11 248 will be off until a load is connected to output plug 340, or in the present embodiment, output plug 340 is inserted into the vehicle cigarette lighter female receiving portion 342.

The above specification and examples are believed to provide a complete description of the manufacture and use of particular embodiments of the invention. Many embodiments of the invention can be made without departing from the spirit and scope of the invention.

We claim:

1. A power source, comprising:

(a) a battery having an input voltage electrically connected to a circuit for generating a modified output voltage;

(b) a connection device electrically connected to the circuit; and (c) a case having a door movable between an open and a closed position, the door arranged and configured to open a switch of the circuit when the door is in a closed position.

2. A power source according to claim 1, wherein the input voltage is 12 volts and the output voltage is 15 volts.

3. A power source according to claim 1, further comprising:

(a) a display for displaying the charge of the battery, the state of charge during charging of an external battery, and the state of charge during recharging of the battery.

4. The power source of claim 1 wherein the circuit for generating a modified output voltage includes a transformer arrangement that generates the modified output voltage.

5. A power source, comprising:
   (a) a battery having an output voltage;
   (b) a power circuit electrically connected to the battery and configured to generate a higher voltage than the output voltage of the battery;
   (c) a connection device electrically connected to the power circuit; and
   (d) a case having a door movable between an open and a closed position, the door arranged and configured to open a switch when the door is in the closed position and thereby disconnect from the battery all components comprising said power circuit.

6. The power source of claim 5 wherein the power circuit includes a transformer arrangement that generates a higher voltage than the voltage of the battery.

* * * * *